United States Patent [19]

Bender

[11] Patent Number: 5,372,052
[45] Date of Patent: Dec. 13, 1994

[54] MOTOR VEHICLE CHANGE-SPEED GEARBOX SHAFT BEARING ARRANGEMENT

[75] Inventor: Helmut Bender, Pleidelsheim, Germany

[73] Assignee: Mercedes-Benz AG, Germany

[21] Appl. No.: 219,852

[22] Filed: Mar. 30, 1994

Related U.S. Application Data

[63] Continuation of Ser. No. 913,005, Jul. 14, 1992, abandoned.

[30] Foreign Application Priority Data

Jul. 16, 1991 [DE] Germany .............. 4123493

[51] Int. Cl.$^5$ .................................. F16H 57/02
[52] U.S. Cl. ......................... 74/606 R; 384/504
[58] Field of Search ............ 74/606 R; 180/377, 379; 384/504, 512, 904

[56] References Cited

U.S. PATENT DOCUMENTS

| | | | |
|---|---|---|---|
| 925,376 | 6/1909 | Phillips et al. | 384/504 |
| 2,014,835 | 9/1935 | Cook . | |
| 2,031,584 | 2/1936 | Austin | 74/366 |
| 4,297,906 | 11/1981 | Costello | 74/606 R X |
| 4,324,152 | 4/1982 | Oshima et al. | 74/606 R |
| 4,411,479 | 10/1983 | Hirata et al. | 384/504 |
| 4,539,865 | 9/1985 | Yoneda et al. | 74/606 R |
| 4,765,688 | 8/1988 | Hofmann et al. | 384/504 X |
| 4,856,375 | 8/1989 | Beim | 74/745 |
| 5,058,455 | 10/1991 | Nemoto et al. | 74/606 R |
| 5,087,231 | 2/1992 | Yamaguchi et al. | 74/606 R X |
| 5,097,717 | 3/1992 | Bardoll | 74/606 R X |

FOREIGN PATENT DOCUMENTS

| | | |
|---|---|---|
| 0278938 | 8/1988 | European Pat. Off. . |
| 0365935 | 5/1990 | European Pat. Off. . |
| 2544338 | 4/1977 | Germany . |
| 3-220025 | 9/1991 | Japan .............. 74/606 R |
| 1367195 | 9/1974 | United Kingdom . |

Primary Examiner—Dirk Wright
Attorney, Agent, or Firm—Evenson, McKeown, Edwards & Lenahan

[57] ABSTRACT

In a bearing arrangement for gearbox shafts in a motor vehicle change-speed gearbox, an output shaft is rotatably supported and also fixed substantially immovably in the directions of the axis of rotation by one rolling contact bearing arrangement in each case relative to a coaxial input shaft and a gearbox casing.

16 Claims, 2 Drawing Sheets

MOTOR VEHICLE CHANGE-SPEED GEARBOX SHAFT BEARING ARRANGEMENT

This application is a continuation of U.S. application Ser. No. 07/913,005, filed on Jul. 14, 1992, now abandoned.

BACKGROUND AND SUMMARY OF THE INVENTION

The present invention concerns a bearing arrangement, and, more particularly, to a bearing arrangement for gearbox shafts in a change-speed gearbox of the countershaft type for motor vehicles, in which a main drive shaft permanently driven by a drive motor is connected to a coaxial input shaft by a selector clutch, used for changing gear and the shaft end, of a coaxial output shaft, opposite to the input shaft is both rotatably supported and fixed so that it cannot move relative to the gearbox casing in the directions of the axis of rotation in a casing wall of a gearbox casing by way of a rolling contact bearing arrangement configured as a fixed location bearing, and in which each of the two shaft ends of the input shaft is supported by a rolling contact bearing arrangement relative to the adjacent shaft ends of the main drive shaft and the output shaft.

In a known bearing arrangement as shown in SU 11 64 088 A, a central input shaft end opposite to the crankshaft, which generally has a fixed location bearing, of the drive motor can be both brought into drive connection by a clutch and be supported by a rolling contact bearing arrangement arranged as a fixed location bearing. The output end, i.e. the shaft end located opposite to the input shaft, of a coaxial output shaft forming the gearbox output is supported in a rear casing wall of the gearbox casing by a rolling contact bearing arrangement arranged as a fixed location bearing. On their shaft ends facing towards one another, the input and output shafts are supported relative to one another by a rolling contact bearing arrangement arranged as a floating bearing.

In this known bearing arrangement, high axial forces appear at the two fixed location bearings of the input and output shafts, particularly where helical teeth are provided on the gear stages which bring these two shafts into drive connection with the countershaft, which is usually parallel thereto.

These axial forces are disadvantageous because the fixed location bearings are located on the casing side so that the axial forces occur at the casing with each of the absolute rotational speeds of the shafts and, in addition, generate unpleasant noises in the gearbox casing. A further disadvantage in the known bearing arrangement is caused by the occurrence of axial clearance between the input shaft and the output shaft due, among other things, to installation tolerances, axial forces and the different temperature expansion coefficients of the shafts and the casing.

An object on which the present invention is based consists essentially in providing a bearing arrangement which avoids the above-mentioned disadvantages.

The object has been achieved in an advantageous manner by arranging the rolling contact bearing arrangement of the adjacent shaft ends of the input shaft and the output shaft as a fixed location bearing so that the input shaft and the output shaft are fixed substantially immovably relative to one another in the directions of the axis of rotation.

In the bearing arrangement of the invention, any axial clearance between the input shaft and the output shaft is removed per se because only one casing-side fixed location bearing remains and the axial forces due to the helical teeth are accepted, on one hand, by the reaction forces on the fixed location bearing between the input shaft and the output shaft and, on the other, by the tooth forces of the gearwheels connected to the countershaft, i.e. they are not transferred to the casing-side fixed location bearing in the gearbox casing.

The present invention applies generally both to so-called simple change-speed gearboxes, in which one and the same input shaft is located in the force path between the main drive shaft and the output shaft in all gears. The invention also relates to change-speed gearboxes of the multi-path type in which at least two input shafts are provided; these paths can be selected during gear changes by the engagement of a respectively associated selector clutch—with a corresponding change in the force path between the main drive shaft and the output shaft.

When the invention is used in a simple change-speed gearbox, in which the selector clutch is connected to a drive pinion of a gearwheel stage for driving the countershaft by an input shaft of short axial length, there is the additional advantage that eccentricity errors in the crankshaft are not transmitted to the drive pinion.

Another advantageous feature of the present invention is a short installation length.

Yet another advantageous feature of the present invention is in twin-path change-speed gearboxes with a central first input shaft and a second input shaft designed as a hollow shaft and arranged concentrically with the first input shaft.

In a further advantageous embodiment of the invention, for a twin-path change-speed gearbox, axial clearance between the two input shafts is avoided, axial forces being also kept away from the casing-side rolling contact bearing arrangement of the second input shaft designed as a hollow shaft.

BRIEF DESCRIPTION OF THE DRAWINGS

These and further objects, features and advantages of the present invention will become more apparent from the following detailed description of currently preferred embodiments when taken in conjunction with the accompanying drawings wherein.

DETAILED DESCRIPTION OF THE DRAWINGS

Figure 1:
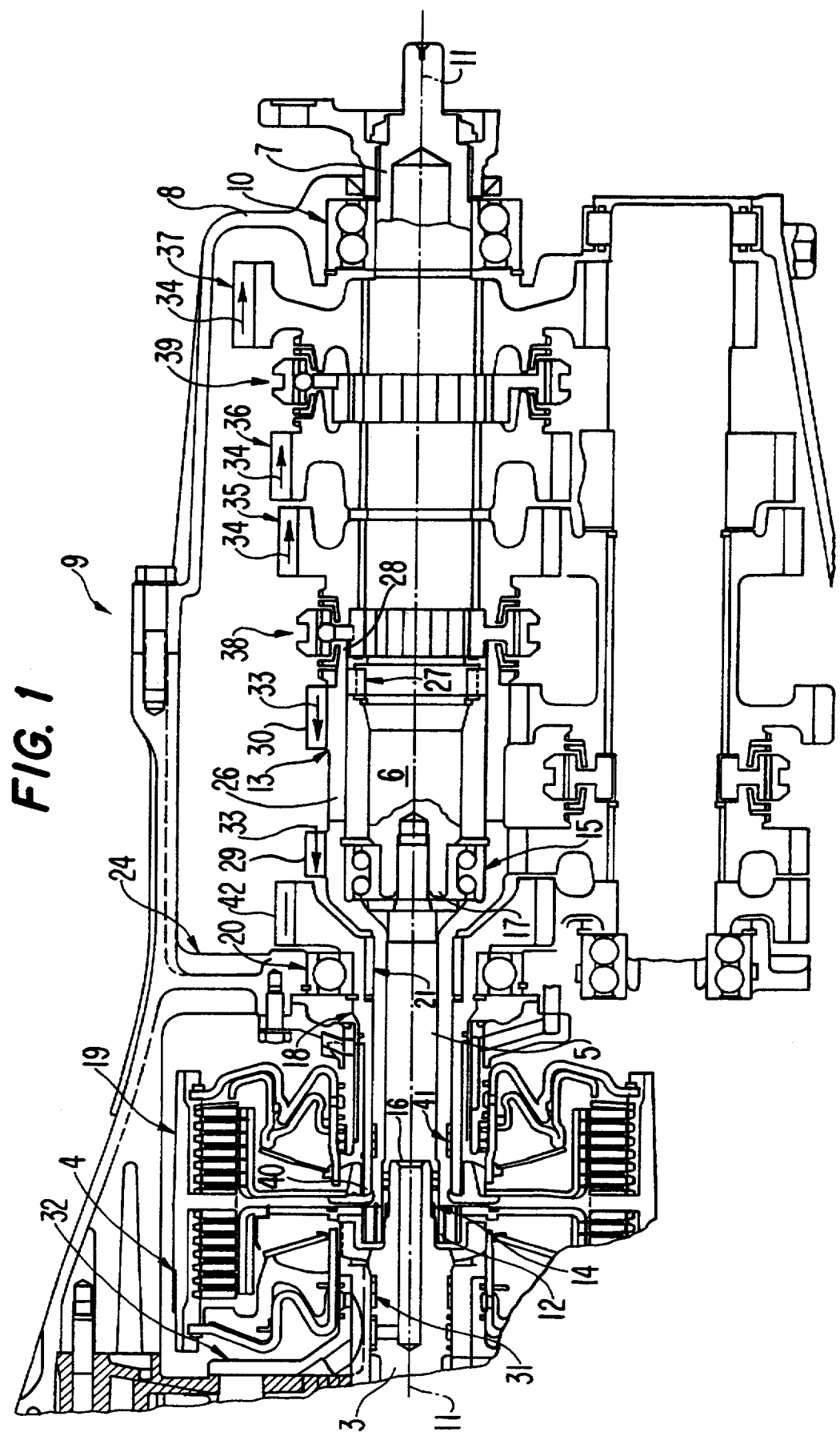
FIG. 1 is a longitudinal sectional view through a twin-path change-speed gearbox of the countershaft type with a bearing arrangement according to a first embodiment of the invention.

Referring now to FIG. 1, a main drive shaft 3, a central input shaft 5 and an output shaft 6 are arranged in series, aligned along an axis of rotation 11—11, in a split gearbox casing 9. The shaft end 16 of the main drive shaft 3, driven in a conventional manner by a crankshaft of a drive motor via a hydrodynamic torque converter, adjacent to the input shaft 5 is rotatably supported by a journal needle bearing 31 relative to a front end wall 32 of the gearbox casing 9. A journal needle bearing 14 is located between the shaft end 16 of the main drive shaft 3 and the adjacent shaft end 12 of the central input shaft 5.

A section 13 of the central input shaft 5 containing the opposite shaft end 28 is configured as a hollow shaft 26 which is supported by a two-row journal angular contact ball bearing 15 formed as a fixed location bearing and also by a cylindrical roller bearing 27 relative to the front section of the output shaft 6. The angular contact ball bearing 15 is located on the front shaft end 17 of the output shaft 6, and the cylindrical roller bearing 27 is located on the rear shaft end 28 of the central input shaft 5.

The rear shaft end 7 of the output shaft 6 is supported relative to a rear end wall 8 of the gearbox casing 9 by a two-row angular contact ball bearing 10 configured as a fixed location bearing. The central input shaft 5 is connected to the main drive shaft 3 by a selector clutch 4 used for changing gear. The hollow shaft 26 carries two rings of helical teeth 29 and 30 formed integrally thereon, and axial forces act on the teeth in the direction indicated by the arrow 33.

Gearwheels 35, 36 and 37 are rotatably supported on the output shaft 6 and can be connected thereto in the conventional manner by a selector clutch 38 or 39. Each of these gearwheels has helical teeth on which axial forces act in the direction indicated by the arrow 34. When the drive clutch 4 is engaged, the force path in the associated lower gears passes through one of the two rings of teeth 29, 30 and subsequently, in known manner, through a countershaft (not fully shown) and finally through one of the gearwheels 35 to 36 to the output shaft 6. The mutually opposed tooth forces 33 and 34 on the input shaft 5 and the output shaft 6 are captured by the fixed location bearing 15 and can therefore not act externally on the gearbox casing 9 via the casing-side fixed location bearing 10.

The central input shaft 5 passes through a second input shaft 18 in the form of a hollow shaft. The front shaft end 40 of the second input shaft 18 is supported relative to the central input shaft 5 by a journal needle bearing 41 and is connected to the main drive shaft 3 by a selector clutch 19 used for changing gear. The second input shaft 18 is supported relative to a third casing wall 4 of the gearbox casing 9 by a single-row journal deep groove ball bearing 20 configured as a fixed location bearing and is also supported, in this axial region, by a cylindrical roller bearing 21 relative to the central input shaft 5. The second input shaft 18 has a ring of teeth 42 integral therewith and in continuous engagement with a gearwheel located on the countershaft and torsionally connected thereto.

Figure 2:
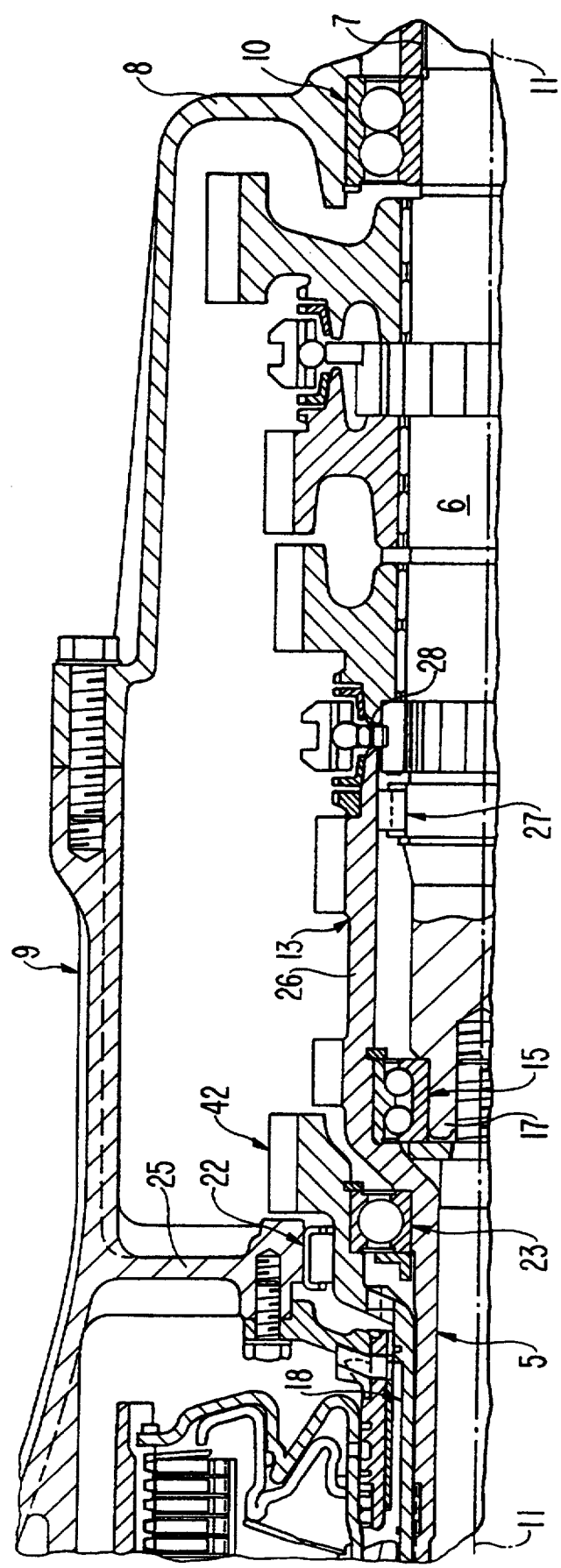
FIG. 2 is a second embodiment of the bearing arrangement of the type shown in FIG. 1.

The embodiment of FIG. 2 differs essentially from the previously described embodiment of FIG. 1 in that the second input shaft 18 is not supported relative to the gearbox casing 9 (central casing wall 25) but, on the contrary, is supported relative to the central input shaft 5 by a fixed location bearing 23, by a single-row journal deep groove roller bearing, and a two-row journal deep groove roller bearing is used for each of the two fixed location bearings 10 and 15 on the output shaft 6. The FIG. 2 embodiment also differs in that the second input shaft 18 is rotatably supported by a cylindrical roller bearing 22 relative to a central casing wall 25. In this embodiment, the axial forces on the ring of teeth 42 cannot act on the casing wall 25. In all other respects, the two embodiments correspond to one another, so that for further details, reference can be made to the description of the embodiment of FIG. 1.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A bearing arrangement for gearbox shafts in a countershaft type change-speed gearbox casing for a motor vehicle, comprising an input shaft configured to be driven by a drive motor, an output shaft coaxial with the input shaft and having a shaft end operatively arranged adjacent an portion of the input shaft so as to be both rotatably supported to one another and the output shaft being fixed relative to the gearbox casing along an axis of rotation of the shafts in the gearbox casing via a first fixed location rolling contact bearing arrangement means, wherein a second fixed location rolling contact bearing arrangement means is arranged between the adjacent shaft ends of the input shaft and the output shaft for fixing the input shaft and the output shaft substantially immovably relative to one another along the axis of rotation of the shafts.

2. The bearing arrangement according to claim 1, wherein an end of the input shaft adjacent to the output shaft is a hollow shaft supported at one end of the hollow shaft by the rolling contact bearing arrangement means and at the other end of the hollow shaft by the second rolling contact bearing arrangement means.

3. The bearing arrangement according to claim 2, wherein the rolling contact bearing arrangement means is located on an end of the output shaft, and the second rolling contact bearing arrangement means is located on an adjacent end of the input shaft.

4. The bearing arrangement according to claim 2, wherein at least one ring of teeth is arranged to be rotationally fixed to the shaft section of the hollow shaft.

5. The bearing arrangement according to claim 4, wherein the ring of teeth is integral with the hollow shaft.

6. The bearing arrangement according to claim 1, wherein a two-row journal angular contact ball bearing constitutes the rolling contact bearing arrangement means between the input shaft and the output shaft.

7. The bearing arrangement according to claim 1, wherein a two-row journal angular contact ball bearing constitutes the rolling contact bearing arrangement means.

8. The bearing arrangement according to claim 1, wherein the second rolling contact bearing arrangement means is located between a second input shaft and a wall of the gearbox casing and is configured as a fixed location bearing.

9. The bearing arrangement according to claim 8, wherein a single-row journal deep groove ball bearing constitutes the rolling contact bearing arrangement means for the second input shaft.

10. The bearing arrangement according to claim 8, wherein a rolling contact bearing arrangement means is located between the two input shafts in the axial region of the second rolling contact bearing arrangement means and for the second input shaft is a hollow shaft.

11. The bearing arrangement according to claim 10, wherein a cylindrical roller bearing constitutes the rolling contact bearing arrangement means located between the two input shafts.

12. The bearing arrangement according to claim 1, wherein a hollow shaft is arranged concentrically with the first input shaft and constitutes a second input shaft connected to the main drive shaft by a second selector clutch used for changing gear ratio, and is also supported by one rolling contact bearing arrangement means relative to a wall of the gearbox casing and to the first input shaft, and the common rolling contact bearing arrangement means of the two input shafts constitutes a fixed location bearing configured so that the two input shafts are fixed substantially immovably relative to one another along the axis of rotation of the shafts.

13. The bearing arrangement according to claim 12, wherein the rolling contact bearing arrangement means for supporting the second input shaft is a cylindrical roller bearing.

14. The bearing arrangement according to claim 12, wherein a two-row journal deep groove ball bearing is the rolling contact bearing arrangement means between the central input shaft and the output shaft.

15. The bearing arrangement according to claim 12, wherein a two-row journal deep groove ball bearing is the rolling contact bearing arrangement means between the output shaft and the gearbox casing.

16. The bearing arrangement according to claim 12 wherein a single-row journal deep groove ball bearing is the rolling contact bearing arrangement means between the two input shafts.

* * * * *